United States Patent [19]
Dreikorn

[11] 3,764,681
[45] Oct. 9, 1973

[54] CERTAIN TETRAZOLO-(1,5-A) QUINOLINE COMPOUNDS AS FUNGUS CONTROL AGENTS

[75] Inventor: Barry A. Dreikorn, Indianapolis, Ind.

[73] Assignee: Eli Lilly and Company, Indianapolis, Ind.

[22] Filed: July 8, 1970

[21] Appl. No.: 53,320

[52] U.S. Cl.............. 424/258, 424/226, 424/248, 260/288, 260/247.5
[51] Int. Cl............................................ A01n 9/22
[58] Field of Search................ 424/258, 248, 226; 260/288

[56] References Cited
UNITED STATES PATENTS
3,389,137  6/1968  Mosby............................ 260/283 P FOREIGN PATENTS OR APPLICATIONS
1,251,327  4/1968  Germany
671,402  10/1965  Belgium Primary Examiner—Albert T. Meyers
Assistant Examiner—Vincent D. Turner
Attorney—Everet F. Smith and Kathleen R. Schmoyer

[57] ABSTRACT

Methods employing and compositions comprising, for the control of plant-pathogenic fungal organisms, specified tetrazolo-(1,5-a)quinoline compounds.

26 Claims, No Drawings

CERTAIN TETRAZOLO-(1,5-A) QUINOLINE COMPOUNDS AS FUNGUS CONTROL AGENTS

SUMMARY OF THE INVENTION

The present invention is directed to novel methods employing and compositions comprising, for the control of plant-pathogenic fungal organisms, tetrazolo(1,5-a)quinoline compounds of the formulae:

I.
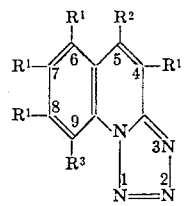

II.
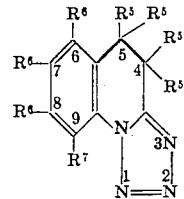

and the phytologically-acceptable mineral acid addition salts of those compounds wherein $R^3$ or $R^7$ represents amino, or $R^1$ or $R^6$ represents $-CH_2Y$ wherein Y is amino or loweralkylamino. In the above and succeeding formulae in the present specification and claims, in compounds of Formula I:

each $R^1$ independently represents hydrogen, halo, lower-alkyl of $C_1-C_3$, formyl, cyano, $R^4$, or substituted methyl of the formula

$-CH_2Y$ wherein Y represents amino, loweralkylamino of $C_1-C_3$, cyano, hydroxy, halo, or loweralkoxy of $C_1-C_3$;

$R^2$ represents $R^1$ or morpholino;

$R^3$ represents $R^1$, amino, or acetamido; and $R^4$ represents azido, alkenyl of $C_2-C_3$, or alkynyl of $C_2-C_3$, subject to the limitation that no more than one $R^1$, $R^2$, or $R^3$ substituent represents $R^4$ and that at least three of the $R^1$, $R^2$, and $R^3$ substituents represent hydrogen; and in compounds of Formula II:

each $R^5$ independently represents hydrogen, halo, cyano, or loweralkyl of $C_1-C_3$;

each $R^6$ independently represents $R^5$, $R^8$, loweralkoxy of $C_1-C_3$, or substituted methyl of the formula

$-CH_2Y$ wherein Y, as above, represents amino, loweralkylamino of $C_1-C_3$, cyano, hydroxy, halo, or loweralkoxy of $C_1-C_3$;

$R^7$ represents $R^6$, amino, or acetamido; and $R^8$ represents alkenyl of $C_2-C_3$ or alkynyl of $C_2-C_3$, subject to the limitation that no more than one $R^6$ or $R^7$ substituent represents $R^8$, and that at least five of the $R^5$, $R^6$, and $R^7$ substituents represent hydrogen.

The compounds defined above are useful for the control of plant-pathogenic fungal organisms. Thus the present invention is directed to methods employing and compositions comprising these compounds for the control of such fungal organisms. In addition, certain of the foregoing compounds of Formula II, those wherein there is at least one $R^5$, $R^6$, or $R^7$ substituent which represents a moiety other than hydrogen, are claimed herein as novel compounds.

Finally, the present invention is also directed to novel synthetic processes and novel intermediates useful in the preparation of the compounds of the present invention which are of Formula II. A first process is the selective reduction at the 4,5-position of compounds of Formula I. A second process comprises the reaction of 3,4-dihydrothiocarbostyrils, as defined, with hydrazine to yield the corresponding 3,4-dihydro-2-hydrazinoquinolines, which are claimed herein as novel intermediates and which on treatment with $HNO_2$ yield the products of Formula II.

DETAILED DESCRIPTION OF THE INVENTION - COMPOUNDS

A. Scope

The scope of compounds serving as a fungal control agent in accordance with the present invention is as defined hereinabove. Where the term "halo" is employed, it refers to fluorine, chlorine, bromine, and iodine, only. Those moieties defined herein as loweralkyl (alone or as part of the composite term, loweralkylamino), loweralkoxy, and alkenyl can be branched- or straight-chain. In the instance of the salts, the term "phytologically-acceptable" is used to designate acids which do not in salt form produce phytotoxicity. The choice of the acid is otherwise not critical, although a given anion may in some instances exhibit special advantages, such as ready solubility, ease of crystallization, and the like. Representative and suitable acids include the following: hydrochloric, hydrobromic, hydriodic, sulfuric, phosphoric, nitric, and the like.

B. Synthesis

The compounds to be employed in accordance with the present invention are prepared by a variety of synthetic methods. Several methods, however, are generally applicable.

1. Method 1

A first method generally useful in the preparation of all of the compounds to be employed in accordance with the present invention is a two-step process leading to the compounds of Formula I. These compounds can thereafter be selectively reduced to obtain the corresponding compounds of Formula II.

In the first step, a carbostyril, typically a carbostyril of the formula

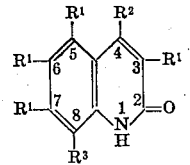

is reacted with $POX_3$ alone or in combination with $PX_5$, X being bromo or chloro, to obtain a corresponding 2-haloquinoline compound:

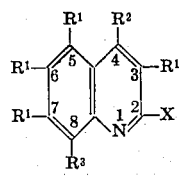

Alternately, there can be employed as starting material a 1-loweralkylcarbostyril, especially a 1-methylcarbostyril:

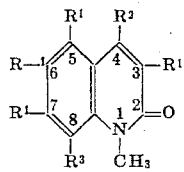

which likewise yields the same corresponding 2-haloquinoline; or a 4-hydroxycarbostyril:

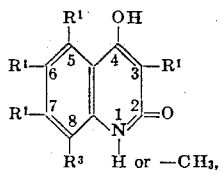

in which case, the product obtained is the corresponding 2,4-dihaloquinoline:

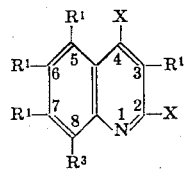

Generally, POCl$_3$ or POBr$_3$ is used; but in the instance of a 1-methylcarbostyril, PCl$_5$ or PBr$_5$ must be used. Most typically, the POX$_3$ or PX$_5$ is used in excess to serve additionally as a solvent, although other solvents can also be used, such as higher boiling hydrocarbons. The reaction proceeds under a wide range of reaction temperatures, such as from 0° to 200°C., but is preferably conducted at reflux temperatures. Separation and, if desired, purification, are carried out by established procedures.

In the second step, the resulting 2-haloquinoline, e.g.,

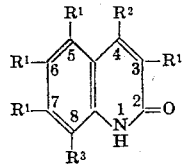

is reacted with hydrozoic acid or azide ion, to obtain the corresponding tetrazolo(1,5-a)quinoline product of Formula I. The reaction is preferably carried out in a solvent and proceeds under a wide range of temperatures, such as from room temperature to reflux temperatures. In the preferred synthetic route, in sequence, the 2-haloquinoline is dissolved in a loweralkanol, typically ethanol, sodium or potassium azide in water is added, followed by a strong acid. Separation and purification are conducted by established procedures.

The foregoing two-step method is useful for the preparation of products of Formula I essentially regardless of the identity of the substituents R$^1$, R$^2$, and R$^3$. Generally, it is preferred that substituents of the specified identity already be present on the starting carbostyril compound. Sometimes, however, it is preferred to conduct the foregoing method with a carbostyril bearing a different substituent than that ultimately desired, and then convert the substituent on the resulting tetrazolo(1,5-a)-quinoline to the desired substituent. Such conversions are conducted in accordance with procedures well known to those skilled in the art. Thus, for example, those compounds of the present invention wherein R$^1$ represents substituted methyl are prepared by reacting a methyl-substituted compound with N-bromosuccinimide in the presence of a small catalytic amount of benzoyl peroxide. This reaction results in the corresponding bromomethyl compound. The bromine atom can then be replaced with other moieties to constitute other substituted methyl groups. Compounds of Formula I wherein R$^2$ represents morpholino are readily prepared by reacting corresponding compounds wherein R$^2$ represents halo with morpholine. Similarly, those compounds of Formula I wherein R$^4$ represents azido, alkenyl as defined, or alkynyl as defined are prepared by reaction of a corresponding halo compound with (respectively) an alkali metal azide, alkenyl-alkali metal, or alkynyl-alkali metal. Those compounds wherein R$^4$ represents alkenyl or alkynyl can also be prepared by halogenation of corresponding alkyl or alkenyl compounds followed by dehydrohalogenation. Those compounds of Formula I wherein R$^3$ represents acetamido are readily prepared from corresponding compounds wherein R$^3$ is amino--which in turn are prepared from correspondingly substituted nitro compounds. Where R$^1$, R$^2$, or R$^3$ represents formyl, the compounds are readily achieved by oxidation of corresponding —CH$_2$OH compounds; and where R$^1$, R$^2$, or R$^3$ represents cyano, by further oxidation to —COOH compounds, amid-ation to -CONH$_2$ compounds, and subsequent dehydration. Still other synthetic methods known to those skilled in the art can be used; reference is made to *Synthetic Organic Chemistry*, Wagner and Zook (John Wiley and Sons, Inc., New York, 1956); and to *Advanced Organic Chemistry*, Fieser and Fieser (Reinhold Publishing Co., New York, 1961).

The foregoing is with respect to the preparation of the compounds of Formula I. It has been discovered that those compounds of the present invention which are of Formula II can generally be prepared by selective reduction at the 4,5-position of the corresponding compounds of Formula I. The selective reduction is achieved by catalytic hydrogenation. In general, the tetrazolo(1,5-a)quinoline of Formula I, conveniently in suitable liquid as reaction medium, is subjected to hydrogenation in the presence of catalyst, typically a noble metal and preferably palladium or platinum. Suitable liquids include the loweralkanols, ethyl acetate, and the loweralkanoic acids. The catalyst can be employed alone, or--especially in the instance of palladium--can be supported on a carrier such as carbon or an alkaline earth salt. Conveniently, a Parr hydrogenator or other pressure apparatus is used to contain the recation mixture during hydrogenation, when conducted at superatmospheric pressures. Temperatures of from 20° to 100°C. are operative, but acceptably good results are normally achieved at room temperatures. The reaction consumes the reactants in amounts representing 1 mole of hydrogen per mole of tetrazolo-(1,5-a)quinoline, and the reaction is preferably stopped after that amount of hydrogen has been taken up, to limit further non-selective reduction. The desired product is separated from the reaction mixture and from other hydrogenation products by established procedures. Most typically, the reaction mixture is filtered to remove remaining catalyst, and the solvent evaporated to separate the product as a residue. This product residue can be purified, typically by recrystallization.

The foregoing reduction reaction, as will be apparent to those skilled in the art, will result in reduction of susceptible substituent groups. Thus, as a method of preparing compounds of Formula II, the above-described reduction is an effective method only for those compounds of the following formula:

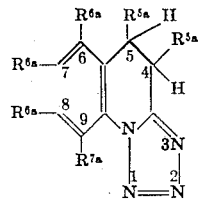

IIa wherein:

each $R^{5a}$ independently represents hydrogen, cyano, or loweralkyl of $C_1-C_3$;

each $R^{6a}$ independently represents $R^{5a}$, halo, loweralkoxy of $C_1-C_3$, or substituted methyl of the formula $$-CH_2Y^a$$

wherein $Y^a$ represents amino, loweralkylamino of $C_1-C_3$, cyano, hydroxy, or loweralkoxy of $C_1-C_3$; and $R^{7a}$ represents $R^{6a}$, amino, or acetamido, subject to the limitation that at least three of the $R^{5a}$, $R^{6a}$, and $R^{7a}$ substituents represent hydrogen.

2. Method 2

The compounds to be employed in accordance with the present invention which are of Formula II generally are also prepared by another reaction sequence. Inasmuch as the reaction sequence involves the use of hydrazine and nitrous acid, the reaction is efficacious only for compounds bearing no substituent reactive with either—notably amine and derivative substituents, halo substituents at the 4 and 5 positions, and halomethyl substituents. Amine-substituted compounds of Formula II can be prepared via Method 1 and subsequent reduction; 4- and 5-halo-substituted compounds can be prepared by halogenation of corresponding 4,5-unsubstituted compounds of Formula I, or in yet other methods. Thus, the method is effective for the preparation of compounds of the formula IIb

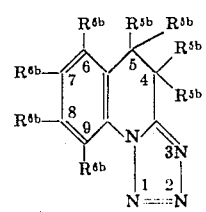

wherein each $R^{5b}$ independently represents hydrogen, cyano, or loweralkyl of $C_1-C_3$;

each $R^{6b}$ independently represents $R^{5b}$, $R^{8b}$, halo, loweralkoxy of $C_1-C_3$, or substituted methyl of the formula $$-CH_2Y^b$$

wherein $Y^b$ represents cyano, hydroxy, or loweralkoxy of $C_1-C_3$;

$R^{8b}$ represents alkenyl of $C_2-C_3$ or alkynyl of $C_2-C_3$, subject to the limitation that no more than one $R^{6b}$ substituent represents $R^{8b}$, and that at least five of the $R^{5b}$ and $R^{6b}$ substituents represent hydrogen.

The reaction sequence comprises a two-step reaction, illustrated by the following diagram:

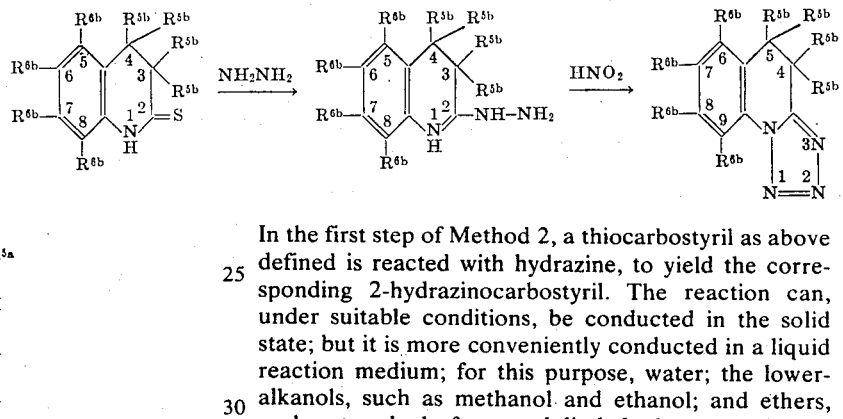

In the first step of Method 2, a thiocarbostyril as above defined is reacted with hydrazine, to yield the corresponding 2-hydrazinocarbostyril. The reaction can, under suitable conditions, be conducted in the solid state; but it is more conveniently conducted in a liquid reaction medium; for this purpose, water; the loweralkanols, such as methanol and ethanol; and ethers, such as tetrahydrofuran and diethyl ether, are suitable. To be avoided is any liquid reaction medium which is reactive with a thione group. The reaction proceeds under a wide range of temperatures, such as from 0° to 100°C.; but it is preferably conducted at temperatures of about 25°. The hydrazine can be supplied to the reaction as such or as hydrazine hydrate or a salt of hydrazine. Separation of the 2-hydrazinocarbostyril is carried out in conventional procedures. The product can additionally be purified, but owing to the reactivity of the hydrazine group, it is generally preferred to employ the crude product directly in the subsequent reaction.

The 2-hydrazinocarbostyril compound has been described above as conforming to the following structure:

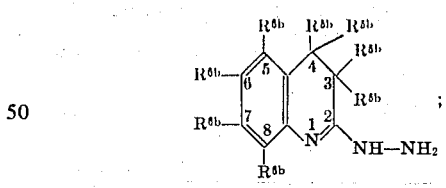

however, it is believed that the compound exists as a tautomer:

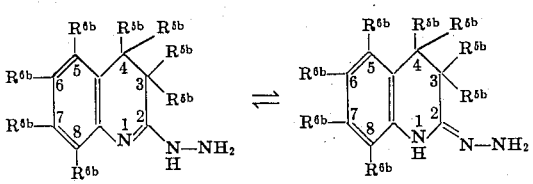

Hence, the configuration initially given, and generally employed for convenience throughout the present specification and claims, designates both tautomeric forms.

In the second step, the 2-hydrazinocarbostyril is reacted with nitrous acid. While the acid can be supplied to the reaction mixture as an aqueous solution thereof, it is preferred that it be generated in situ, conveniently by the reaction of sodium or other alkali metal nitrate with an acid which can be a mineral acid such as hydrochloric acid or an organic acid such as acetic acid. The reaction is conveniently conducted in a liquid as reaction medium; suitable such liquids include water/acetic acid, water/formic acid, hydrochloric acid, and the like. The reaction proceeds under reaction temperatures of a range from −15° to 15°C. but is preferably conducted at temperatures below 5.0°C. Separation and, if desired, purification, can be carried out by established procedures.

While the foregoing synthetic route is effective in the synthesis of essentially all of the compounds of Formula II, modifications of the route are sometimes preferable. As in the case of Method 1, described hereinabove, it is generally preferred that substituents, when inert to the reagents employed, be present in the starting thiocarbostyril. However, it is necessary, in the instance of substituents not inert to the reagents employed, to conduct subsequent reactions to alter the identity of substituents already present, as discussed hereinabove for compounds of Formula I (or to use Method 1); such subsequent introduction of desired substituents is also possible and is sometimes preferred even for substituents inert to the reaction sequence. Also, compounds of Formula II bearing 4- or 5-halo substituents can be dehydrogenated or dehydrohalogenated to convert to corresponding compounds of Formula I.

3. Method 3 - Salts

Certain of the compounds of Formulae I or II--those wherein $R^3$ or $R^7$ represents amino, or $R^1$ or $R^6$ represents —$CH_2Y$ wherein Y is amino or loweralkylamino--form acid addition salts with mineral acids. The salts are prepared in conventional procedures, by the reaction in a suitable solvent of the compound of Formula I or II as a free base with the desired mineral acid. Separation and, if desired, purification, are carried out in established procedures.

C. Novel Compounds and Preferred Compounds

All of the compounds of Formulae I and II are effective in controlling plant-pathogens. However, only certain of these compounds are claimed as new compounds. These are the compounds of the following formula:

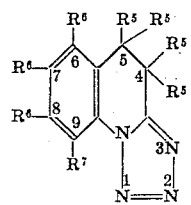

and the phytologically-acceptable mineral acid addition salts of those compounds wherein $R^7$ represents amino, or $R^6$ represents —$CH_2Y$ wherein Y is amino or loweralkylamino; wherein, in the above formula, each $R^5$ independently represents hydrogen, halo, cyano, or loweralkyl of $C_1$–$C_3$;

each $R^6$ independently represents $R^5$, $R^8$, loweralkoxy of $C_1$–$C_3$, or substituted methyl of the formula

—$CH_2Y$ wherein Y, as above, represents amino, loweralkylamino of $C_1$–$C_3$, cyano, hydroxy, halo, or loweralkoxy of $C_1$–$C_3$;

$R^7$ represents $R^6$, amino, or acetamido; and $R^8$ represents alkenyl of $C_2$–$C_3$, or alkynyl of $C_2$–$C_3$, subject to the limitation that no more than one $R^6$ or $R^7$ substituent represents $R^8$, and that at least five but not more than seven of the $R^5$, $R^6$, and $R^7$ substituents represent hydrogen.

Of this group of compounds, preferred members are those of the formula

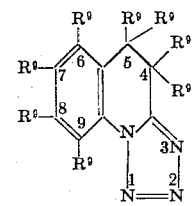

wherein each $R^9$ independently represents hydrogen, methyl, halo, or cyano, there being at least one but not more than three groups representing methyl, halo, or cyano.

The following examples illustrate the synthesis of the compounds of the present invention.

Example 1: 2-Chloro-6-Ethyl-4-Methylquinoline

6-Ethyl-4-methylcarbostyril (0.25 gram) and 17 milliliters of phosphorus oxychloride were mixed and the mixture heated to 120°C. for 3 hours. The reaction mixture was then cooled and poured onto ice water, precipitating the desired 2-chloro-6-ethyl-4-methylquinoline product. It was separated by filtration and used directly in the preparation of 7-ethyl-5-methyltetrazolo-(1,5-a)quinoline.

Example 2: 2,4-Dichloro-3,8-Dimethylquinoline 3,8-Dimethyl-4-hydroxycarbostyril (131.0 grams; 0.164 mole) was placed in a three-necked flask equipped with a mechanical stirrer and refluxing condensor. Phosphoryl chloride (160 milliliters) was then added and the reaction mixture refluxed overnight. Water was then slowly added to the reaction mixture, with stirring; the temperature of the reaction mixture was maintained throughout at 50°–60°C. by the addition of ice. As a result, the desired 2,4-dichloro-3,8-dimethylquinoline precipitated in the reaction mixture and was separated by filtration and recrystallized from ethanol, m.p., 78°–78.5°C.

Example 3: 2-Chloro-8-Methylquinoline 1,8-Dimethylcarbostyril (16 grams; 0.092 mole) was slowly added to 44 milliliters of phosphorus oxychloride at 0°C. Keeping the temperature low, 20 grams of phosphorus pentachloride (about 0.096 mole) was added and the temperature of the stirred mixture was slowly raised to 125°–130°. After 2 hours at this temperature, the mixture was cooled to room temperature and poured into 1 liter of stirred ice water. The desired 2-chloro-8-methylquinoline precipitated and was separated by filtration and recrystallized from methanol, m.p., 60°–61°C.

Example 4: 9-Methyltetrazolo(1,5-a)Quinoline

2-Chloro-8-methylquinoline (7 grams; 0.04 mole) was dissolved in 100 milliliters of 10 percent aqueous ethanol. To this was added 3.25 grams (0.05 mole) sodium azide in a minimum amount of water. Thereafter, 50 milliliters of 10 percent hydrochloric acid were added with stirring. The resulting reaction mixture was refluxed with stirring for sixteen hours, cooled to room temperature, filtered, washed with water and dried. It was then recrystallized from anhydrous ethanol, m.p., 196°–97°C.

Identity of the product was confirmed by NMR, IR, and elemental analysis.

Analysis, Calc.: C, 65.20; H, 4.38; N, 30.42 Found: C, 65.41; H, 4.59; N, 30.21.

Example 5: 9-(Bromomethyl)Tetrazolo(1,5-a)Quinoline

9-Methyltetrazolo(1,5-a)quinoline (20 grams; 0.108 mole) was dissolved in 1500 milliliters of carbon tetrachloride. To this was added 20 grams (0.12 mole) of N-bromosuccinimide and a trace of benzoyl peroxide. The stirred mixture was heated with a heating mantle and irradiated with a sun lamp while being refluxed until none of the N-bromosuccinimide remained in the flask (about five hours). The reaction mixture was then cooled and filtered, and carbon tetrachloride removed on a rotary evaporator. A yellow solid, the desired 9-(bromoethyl)tetrazolo(1,5a)quinoline product, remained. It was recrystallized from chloroform, m.p., 206°C.

Analysis, Calc.: C, 45.65; H, 2.68; N, 21.30; Br, 30.38. Found: C, 45.71; H, 2.77; N, 21.35; Br, 30.50.

Example 6: 4,5-Dihydrotetrazolo(1,5-a)Quinoline

Tetrazolo(1,5-a)quinoline (100 grams; 0.59 mole) in 1500 milliliters of acetic acid and 5 grams platinum oxide was hydrogenated on a Parr shaker at 50 pounds hydrogen pressure for seventy-two hours. The mixture was filtered to remove the catalyst, and the acetic acid was removed in a rotary evaporator. A yellow oil resulted which solidified on standing. The solid was recrystallized from anhydrous ethanol to yield 49 grams of the desired 4,5-dihydrotetrazolo(1,5-a)quinoline product, m.p., 117°–18°C. Analysis, Calc.: C, 62.77; H, 4.68; N, 32.54. Found: C, 62.63; H, 4.78; N, 32.48.

Example 7: 9-(Hydroxymethyl)Tetrazolo(1,5-a)Quinoline 9-(Bromomethyl)tetrazolo(1,5-a)quinoline (11.5 grams) was dissolved in 25 milliliters of dimethyl sulfoxide to which 10 milliliters of water was then added. The resulting reaction mixture was stirred at room temperature overnight, then filtered to separate the desired 9-(hydroxymethyl)tetrazolo(1,5-a)quinoline product. It was recrystallized from anhydrous ethanol, m.p., 214°–15°C.

Analysis Calc.: C, 59.99; H, 4.03; N, 27.99. Found: C, 59.96; H, 4.10; N, 27.72.

Example 8: 9-Formyltetrazolo(1,5-a)Quinoline 9-(Hydroxymethyl)tetrazolo(1,5-a)quinoline (8.0 grams) was dissolved in 300 milliliters of hot acetic acid and cooled to 60°C. To the cooled solution, there was then added 6 grams of chromic oxide; the reaction mixture was maintained for one hour at 50°–60°C., then cooled to room temperature, poured into ice water, and allowed to stand overnight at room temperature. The reaction mixture was filtered to separate the desired 9-formyltetra-zolo(1,5-a)quinoline compound, m.p., 214(d)°C.

Analysis, Calc.: C, 60.60; H, 3.05; N, 28.27. Found: C, 60.53; H, 3.24; N, 28.04.

Example 9: 5-(Methoxymethyl)Tetrazolo(1,5-a)Quinoline

A solution of 4 grams of sodium in 100 milliliters of methanol was prepared. To it was added 3.5 grams of 5-(bromomethyl)-tetrazolo(1,5-a)quinoline. The resulting reaction mixture was refluxed overnight, poured into ice/water, then filtered to separate the desired 5-(methoxymethyl)tetrazolo(1,5-a)quinoline, m.p., 195°–96°C.

Analysis, Calc.: C, 59.99; H, 4.03; N, 27.99. Found: C, 59.81; H, 4.24; N, 28.22.

Example 10: 9-Nitrotetrazolo(1,5-a)Quinoline

2-Chloro-8-nitroquinoline (34.5 grams; 0.166 mole) was dissolved in 250 milliliters anhydrous ethanol. To this was added a solution of 13.0 grams (0.2 mole) sodium azide in a minimum amount of water. The solution was heated to about 50°C. and 300 milliliters of 10 percent hydrochloric acid were added. The stirred solution was refluxed for eighteen hours, cooled and filtered. A white solid (35.5 grams) was isolated and crystallized from anhydrous ethanol, m.p. 199°–200°C.

Analysis, Calc.: C, 50.23; H, 2.34; N, 32.55. Found: C, 50.45; H, 2.61; N, 32.42.

Example 11: 9-Aminotetrazolo(1,5-a)Quinoline

9-Nitrotetrazolo(1,5-a)quinoline (5 grams) was added to 250 milliliters of acetic acid and about 1 gram of platinum oxide, and hydrogenated on a Parr shaker until the rate of hydrogen uptake markedly diminished (about one and one-half hours). The reaction mixture was then filtered and solvent removed from the filtrate. The desired 9-aminotetrazolo(1,5-a)quinoline was obtained from ethanol recrystallization (2.3 grams), m.p., 196°–200°C.

Analysis, Calc.: C, 58.38; H, 3.81; N, 37.82. Found: C, 58.31; H, 4.09; N, 37.67.

Example 12: 9-Acetamidotetrazolo(1,5-a)Qinoline

9-Aminotetrazolo(1,5-a)quinoline (2.3 grams) was added to a solution of 100 milliliters of benzene and 10 milliliters of acetic anhydride and refluxed with stirring overnight. The solvent was then removed in a rotary evaporator, and the solid remaining recrystallized from anhydrous ethanol, yielding 0.65 gram of the expected 9-acetamidotetrazolo(1,5-a)quinoline, m.p., 194°–96°C.

Analysis, Calc.: C, 58.11; H, 3.99; N, 30.82. Found: C, 58.11; H, 4.12; N, 30.55.

Example 13: 5-Morpholinotetrazolo(1,5-a)Qinoline

5-Chlorotetrazolo(1,5-a)quinoline (5 grams) was added to 100 milliliters of ethanol; thereafter, 10 milliliters of morpholine was added and the resulting reaction mixture refluxed overnight. The reaction mixture was then cooled and poured into ice water, and subsequently filtered to separate 3.1 grams of a whitish solid, the desired 5-morpholinotetrazolo(1,5-a)quinoline compound. It was recrystallized from ethanol, m.p., 127.5°–29°C.

Analysis, Calc.: C, 61.16; H, 5.13; N, 27.44. Found: C, 60.94; H, 5.02; N, 27.68.

Example 14: 3,4-Dihydro-2-Hydrazinoquinoline 3,4-Dihydrothiocarbostyril (1.8 grams; 0.01 mole) was dissolved in 20 milliliters of hot ethanol. To this was added an excess of anhydrous hydrazine (≈2 milliliters). A color change immediately occurred (from yellow-orange to greenish-yellow). The reaction mixture was spotted on a TLC plate to ascertain when the reaction was completed. It appeared to be complete almost instantaneously. The solution was placed in a rotary evaporator, and the solvent and excess hydrazine were removed, to yield the desired 3,4-dihydro-2-hydrazinoquinoline compound. It was recrystallized from ether.

Example 15: 4,5-Dihydrotetrazolo(1,5-a)Quinoline

To a solution of 0.6 gram of 3,4-dihydro-2-hydrazinoquinoline (0.0037 mole) prepared as described hereinabove in Example 14 and employed herein without recrystallization, in 10 milliliters of 50 percent aqueous acetic acid, there was added 0.25 gram of sodium nitrite (0.0037 mole). The sodium nitrite was added portionwise, in a minimum amount of water, and throughout the addition, the temperature was kept between 0°–5°C. After the addition was completed, the reaction mixture was diluted with 10 milliliters ice water and the solution made basic with ammonium hydroxide. The solid which precipitated was filtered and collected to yield 0.32 gram of 4,5-dihydrotetrazolo(1,5-a)quinoline, which was recrystallized from ethanol. The product so obtained was identical in every respect to the same product made from catalytic reduction of tetrazolo(1,5-a)quinoline.

Example 16:
4,5-Dichloro-4,5-Dihydrotetrazolo(1,5-a)Quinoline

Tetrazolo(1,5-a)quinoline (1 gram) was slurried in 300 milliliters of carbon tetrachloride and cooled to 0° in an ice bath, and the reaction mixture was saturated with chlorine gas. The reaction mixture was then stirred overnight at room temperature and the solvent removed in a rotary evaporator; a quantitative yield of 4,5-dichloro-4,5-dihydrotetrazolo(1,5-a)quinoline was obtained. Its identity was confirmed by NMR. In another preparation, the same product melted at 162°–64°C.

Example 17: 4-Chlorotetrazolo(1,5-a)Quinoline 4,5-Dichloro-4,5-dihydrotetrazolo(1,5-a)quinoline (2 grams) was dissolved in 5 milliliters of triethylamine and 25 milliliters of ethanol. The resulting reaction mixture was refluxed overnight, separated by filtration, and recrystallized from ethanol, m.p., 233°–35°C.

Example 18: 9-Aminotetrazolo(1,5-a)Quinoline, Hydrochloride Salt

9-Aminotetrazolo(1,5-a)quinoline (1.0 gram; 0.0039 mole) was dissolved in a minimum amount of anhydrous tetrahydrofuran. To this solution was added anhydrous hydrochloric acid. A white precipitate formed. This was filtered and collected, m.p., 241°–42(d)°C.

Examples 19–67:

Other representative compounds of Formula I, prepared in the methods described and exemplified hereinabove using analogous starting materials, are the following:

Formula I

Tetrazolo(1,5-a)quinoline, m.p., 156°C.
9-Chlorotetrazolo(1,5-a)quinoline, m.p., 195°–220°C.
5-((Ethylamino)methyl)tetrazolo(1,5-a)quinoline, m.p., 118°C.
9-(Methoxymethyl)tetrazolo(1,5-a)quinoline, m.p., 160°–61°C.
5-Vinyltetrazolo(1,5-a)quinoline
9-(Ethoxymethyl)tetrazolo(1,5-a)quinoline, m.p., 176°–77°C.
9-Fluoro-5-methyltetrazolo(1,5-a)quinoline, m.p., 212°–13°C.
9-Bromo-5-methyltetrazolo(1,5-a)quinoline, m.p., 185°–86°C.
7-Ethynyltetrazolo(1,5-a)quinoline
5-Ethyltetrazolo(1,5-a)quinoline, m.p., 134°–35°C.
7-Chlorotetrazolo(1,5-a)quinoline, m.p., 221°–22°C.
5-Chlorotetrazolo(1,5-a)quinoline, m.p., 148°C.
5-(Aminomethyl)tetrazolo(1,5-a)quinoline
5-Azidotetrazolo(1,5-a)quinoline, m.p., 185°C.
8-Methyltetrazolo(1,5-a)quinoline, m.p., 143°–44°C.
5-Methyltetrazolo(1,5-a)quinoline, m.p., 212°–13°C.
5-Iodotetrazolo(1,5-a)quinoline
5-(Bromomethyl)tetrazolo(1,5-a)quinoline, m.p., 184°–85°C.
5-Cyanotetrazolo(1,5-a)quinoline, m.p., 232°–35°C.
9-(Cyanomethyl)tetrazolo(1,5-a)quinoline, m.p., 221°–22°C.
9-n-Propyltetrazolo(1,5-a)quinoline
5-Chloro-4-methyltetrazolo(1,5-a)quinoline, m.p., 157°–58°C.
5-(Hydroxymethyl)tetrazolo(1,5-a)quinoline, m.p., 249°–51°C.
5-Chloro-4-ethyltetrazolo(1,5-a)quinoline, m.p., 113°–14°C.
5-Chloro-9-((methylamino)methyl)tetrazolo(1,5-a)quinoline
5-Chloro-7-methyltetrazolo(1,5-a)quinoline, m.p., 150°–52°C.
5-Chloro-9-methyltetrazolo(1,5-a)quinoline, m.p., 176°–78°C.
5,9Dichlorotetrazolo(1,5-a)quinoline, m.p., 152°–54°C.
8-((Isopropylamino)methyl)tetrazolo(1,5-a)quinoline
5-Azido-7-methyltetrazolo(1,5-a)quinoline, m.p., 187°–89°C.
5-Azido-9-chlorotetrazolo(1,5-a)quinoline, m.p., 170°–71°C.
5-Azido-7-methyltetrazolo(1,5-a)quinoline, m.p., 187°–89°C.
5-Azido-9-chlorotetrazolo(1,5-a)quinoline, m.p., 170°–71°C.
5-Chloro-4,9-dimethyltetrazolo(1,5-a)quinoline, m.p., 202°–04°C.
5,9-Bis(chloromethyl)tetrazolo(1,5-a)quinoline
5,9-Dichloro-4-methyltetrazolo(1,5-a)quinoline, m.p., 162°–63°C.
5-Chloro-9-fluoro-4-methyltetrazolo(1,5-a)quinoline, m.p., 179°–80°C.

5-Chloro-9-fluorotetrazolo(1,5-a)quinoline, m.p., 188°–90°C.

5,6,9-Trichlorotetrazolo(1,5-a)quinoline

5-Chloro-9-methyltetrazolo(1,5-a)quinoline, m.p., 210°C.

9-Ethyl-5-methyltetrazolo(1,5-a)quinoline, m.p., 110°–11°C.

7-Ethyl-5-methyltetrazolo(1,5-a)quinoline, m.p., 160°–62°C.

5-Morpholino-7,9-dichlorotetrazolo(1,5-a)quinoline

7-Chloro-5-methyltetrazolo(1,5-a)quinoline, m.p., 183°–84°C.

5-Methyl-4-chlorotetrazolo(1,5-a)quinoline, m.p., 204°–05.5°C.

9-Chloro-5-methyltetrazolo(1,5-a)quinoline, m.p., 189°–90°C.

9-(Iodomethyl)tetrazolo(1,5-a)quinoline

7-Methyltetrazolo(1,5-a)quinoline, m.p., 163°C.

5-Bromotetrazolo(1,5-a)quinoline, m.p., 167°–70°C.

5,9-Dimethyltetrazolo(1,5-a)quinoline, m.p., 196°–97°C.

5,7-Dimethyltetrazolo(1,5-a)quinoline, m.p., 180°C.

Examples 68–93:

Other representative compounds of Formula II are prepared as described in accordance with the foregoing teachings.

8-Chloro-3,4-dihydrothiocarbostyril is reacted with hydrazine to yield 8-chloro-2-hydrazino-3,4-dihydroquinoline, which when reacted with nitrous acid (formed in situ by the reaction of sodium nitrite and acetic acid) yields the desired product, 9-chloro-4,5-dihydrotetrazolo(1,5-a)quinoline, m.p., 164°–65°C.

6-Methyl-3,4-dihydrothiocarbostyril is reacted with hydrazine to yield 6-methyl-2-hydrazino-3,4-dihydroquinoline, which when reacted with nitrous acid (formed in situ by the reaction of sodium nitrite and acetic acid) yields the desired product, 7-methyl-4,5-dihydrotetrazolo(1,5-a)quinoline, m.p., 144°C.

3,4-Dihydro-8-methylthiocarbostyril is reacted with hydrazine to yield 2-hydrazino-3,4-dihydro-8-methylquinoline, which when reacted with nitrous acid (formed in situ by the reaction of sodium nitrite and acetic acid) yields the desired product, 4,5-dihydro-9-methyltetrazolo(1,5-a)quinoline.

9-Methyltetrazolo(1,5-a)quinoline is reacted with chlorine gas to yield 4,5-dichloro-4,5-dihydro-9-methyltetrazolo(1,5-a)quinoline, m.p., 123°–25°C.

3,4-Dihydro-6-methoxythiocarbostyril is reacted with hydrazine to yield 2-hydrazino-3,4-dihydro-6-methoxyquinoline, which when reacted with nitrous acid (formed in situ by the reaction of sodium nitrite and acetic acid) yields the desired product, 4,5-dihydro-7-methoxytetrazolo(1,5-a)quinoline, m.p., 146°–48°C.

6-Chloro-3,4-dihydrothiocarbostyril is reacted with hydrazine to yield 6-chloro-3,4-dihydro-2-hydrazinoquinoline, which when reacted with nitrous acid (formed in situ by the reaction of potassium nitrite and acetic acid) yields the desired product, 7-chloro-4,5-dihydrotetrazolo(1,5-a)quinoline, m.p., 168°C.

3,4-Dihydro-8-fluoro-4-methylthiocarbostyril is reacted with hydrazine to yield 3,4-dihydro-4-methyl-8-fluoro-2-hydrazinoquinoline, which when reacted with nitrous acid (formed in situ by the reaction of sodium nitrite and acetic acid) yields the desired product 4,5-dihydro-9-fluoro-5-methyltetrazolo(1,5-a)-quinoline.

8-Bromo-3,4-dihydro-4-methylthiocarbostyril is reacted with hydrazine to yield 8-bromo-2-hydrazino-3,4-dihydro-4-methylquinoline, which when reacted with nitrous acid (formed in situ by the reaction of sodium nitrite and acetic acid) yields the desired product, 9-bromo-4,5-dihydro-5-methyltetrazolo(1,5-a)-quinoline.

4,5-Dihydro-9-(methoxymethyl)tetrazolo(1,5-a)quinoline is prepared by reducing the corresponding 9-(methyoxymethyl)tetrazolo-(1,5-a)quinoline.

3,4-Dihydro-4-ethylthiocarbostyril is reacted with hydrazine to yield 3,4-dihydro-4-ethyl-2-hydrazinoquinoline, which when reacted with nitrous acid (formed in situ by the reaction of sodium nitrite and acetic acid) yields the desired product, 4,5-dihydro-5-ethyltetrazolo(1,5-a)quinoline.

4,5-Dihydro-9-(ethoxymethyl)tetrazolo(1,5-a)quinoline is prepared by reducing 9-(ethoxymethyl)-tetrazolo(1,5-a)quinoline.

3,4-Dihydro-4,8-dimethylthiocarbostyril is reacted with hydrazine to yield 3,4-dihydro-4,8-dimethyl-2-hydrazinoquinoline, which when reacted with nitrous acid (formed in situ by the reaction of sodium nitrite and acetic acid) yields the desired product, 4,5-dihydro-5,9-dimethyltetrazolo(1,5-a)quinoline.

3,4-Dihydro-8-isopropoxythiocarbostyril is reacted with hydrazine to yield 3,4-dihydro-8-isopropoxy-2-hydrazinoquinoline, which when reacted with nitrous acid yields the desired product, 4,5-dihydro-9-isopropoxytetrazolo(1,5-a)quinoline.

4,5-Dihydro-6-((ethylamino)methyl)tetrazolo(1,5-a)-quinoline is prepared by catalytically reducing 6-((ethylamino)methyl)-tetrazolo(1,5-a)quinoline.

8-(Cyanomethyl)-3,4-dihydrothiocarbostyril is reacted with hydrazine to yield 8-(cyanomethyl)-3,4-dihydro-2-hydrazinoquinoline, which when reacted with nitrous acid yields the desired product, 9-(cyanomethyl)-4,5-dihydrotetrazolo(1,5-a)quinoline.

3,4-Dihydro-8-(hydroxymethyl)thiocarbostyril is reacted with hydrazine to yield 2-hydrazino-3,4-dihydro-8-(hydroxymethyl)-quinoline, which when reacted with nitrous acid yields the desired product, 4,5-dihydro-9-(hydroxymethyl)tetrazolo(1,5-a)quinoline.

3,4-Dihydro-6-methylthiocarbostyril is reacted with hydrazine to yield 2-hydrazino-3,4-dihydro-6-methylquinoline, which when reacted with nitrous acid yields the desired product, 4,5-dihydro-7-methyltetrazolo(1,5-a)quinoline.

3,4-Dihydro-8-nitrothiocarbostyril is reacted with hydrazine to yield 2-hydrazino-3,4-dihydro-8-nitroquinoline which when reacted with nitrous acid yields the desired product, 4,5-dihydro-9-nitrotetrazolo(1,5-a)quinoline; this product is hydrogenated to obtain 9-amino-4,5-dihydrotetrazolo(1,5-a)quinoline.

8-Chloro-3,4-dihydro-4-n-propylthiocarbostyril is reacted with hydrazine to yield 8-chloro-2-hydrazino-3,4-dihydro-4-n-propyl-quinoline, which when reacted with nitrous acid yields the desired product, 9-chloro-4,5-dihydro-5-n-propyltetrazolo(1,5-a)quinoline.

9-Aminotetrazolo(1,5-a)quinoline is catalytically hydrogenated to obtain 9-amino-4,5-dihydrotetrazolo(1,5-a)quinoline.

8-Cyano-3,4-dihydrothiocarbostyril is reacted with hydrazine to yield 8-cyano-2-hydrazino-3,4- dihydroquinoline, which when reacted with nitrous acid yields the desired product, 9-cyano-4,5-dihydrotetrazolo(1,5-a)quinoline.

9-Acetamidotetrazolo(1,5-a)quinoline is catalytically hydrogenated to obtain 9-acetamido-4,5-dihydrotetrazolo(1,5-a)-quinoline.

9-Methyltetrazolo(1,5-a)quinoline is reacted with chlorine to obtain 4,5-dichloro-4,5-dihydro-9-methyltetrazolo-(1,5-a)quinoline.

5-(Aminomethyl)tetrazolo(1,5-a)quinoline is catalytically hydrogenated to obtain 5-(aminomethyl)-4,5-dihydrotetrazolo(1,5-a)-quinoline.

3,4-Dihydro-4,4-dimethylthiocarbostyril is reacted with hydrazine to yield 2-hydrazino-3,4-dihydro-4,4-dimethylquinoline, which when reacted with nitrous acid yields the desired product, 4,5-dihydro-5,5-dimethyltetrazolo(1,5-a)quinoline.

7-(Hydroxymethyl)tetrazolo(1,5-a)quinoline is catalytically hydrogenated to obtain 7-(hydroxymethyl)-4,5-dihydrotetrazolo(1,5-a)-quinoline, which is converted to 7-(bromomethyl)-4,5-dihydrotetrazolo(1,5-a)quinoline.

DETAILED DESCRIPTION OF THE INVENTION: UTILITY

It has been discovered that the compounds of Formulae I and II (hereinafter referred to as "tetrazoloquinoline compounds") are adapted to be employed for the control of a wide range of plant pathogens, including fungal organisms, bacterial organisms, and viral organisms. Thus, the tetrazoloquinoline compounds can be employed for the control of such organisms as crown gall, damping off, apple scab, rice blast, powdery mildew, anthracnose, and late blight. The compounds are particularly suited for the control of bacterial and fungal organisms, especially fungal organisms, and give particularly good results in the control of rice blast.

The compounds can be employed and are effective when utilized in any of a number of embodiments. In accordance with prevalent practice, the compounds can be applied, and are effective against plant-pathogenic organisms when applied, to the foliage of plants susceptible to attack. In addition, the tetrazoloquinoline compounds can be applied to seeds to protect the seeds and ensuing plants from the attack of plant-pathogenic organisms. Also, the compounds can be distributed in soil to control plant-pathogenic organisms. It has been found that many of the compounds are translocated through plants, so that in this last embodiment, control is achieved of foliage-attacking organisms as well as organisms which attack other plant parts.

Most broadly, the method of the present invention for the control of plant-pathogenic organisms comprises applying to a locus of the organisms an effective amount of one or more of the tetrazoloquinoline compounds. The tetrazoloquinoline compounds can be used alone; but the present invention also embraces the employment of a liquid, powder, or dust composition containing one or more of the tetrazoloquinoline compounds. Such compositions are adapted to be applied to living plants without substantial injury to the plants. In preparing such compositions, the tetrazoloquinoline compounds can be modified with one or more of a plurality of additaments including organic solvents, petroleum distillates, water or other liquid carriers, surface active dispersing agents, and finely divided inert solids.

In such compositions, the tetrazoloquinoline compound can be present in a concentration from about 2 to 98 percent by weight. Depending upon the concentration in the composition of the tetra-zoloquinoline compound, such augmented compositions are adapted to be employed for the control of undesirable plant pathogens or employed as concentrates and subsequently diluted with additional inert carrier to produce the ultimate treating compositions. Preferred compositions are those comprising both a finely divided solid and a surface active agent.

The exact concentration of the tetrazoloquinoline compound employed in the composition for application to plant-pathogens and/or their habitats can vary provided an effective amount is applied either on the organism or its environment. The amount which is effective is dependent in part upon the susceptibility of the particular plant pathogen and upon the activity of the compound employed. In general, good results are obtained with liquid compositions containing from about 0.001 to 0.1 percent or more by weight of tetrazoloquinoline compound. With dusts, good results are usually obtained with compositions containing from 0.5 to 5.0 percent or more by weight of tetrazoloquinoline compound. In terms of acreage application, good controls of plant pathogens are obtained when the tetrazoloquinoline compounds are applied to plots of growing plants at a dosage of from 0.5 to 5.0 or more pounds per acre.

In the preparation of dust compositions, tetrazoloquinoline compounds can be compounded with any of the finely divided solids such as pyrophyllite, talc, chalk, gypsum, and the like. In such operations, the finely divided carrier is ground or mixed with the tetrazoloquinoline compound or wet with a solution of the same in a volatile organic solvent. Similarly, dust compositions contain-ing the products can be compounded with various solid surface active dispersing agents such as fuller's earth, bentonite, attapulgite, and other clays. Depending upon the proportions of ingredients, these dust compositions can be employed for the control of plant pathogens or employed as concentrates and subsequently diluted with an additional solid surface active dispersing agent or with pyrophyl-lite, chalk, talc, gypsum, and the like to obtain the desired amount of active ingredient in a composition adapted to be employed for the control of plant pathogens. Also, such dust compositions, when employed as concentrates, can be dispersed in water, with or without the aid of dispersing agents, to form spray mixtures.

Further, the tetrazoloquinoline compounds or a liquid or dust concentrate composition containing such compounds can be incorporated in intimate mixture with surface active dispersing agents such as non-ionic emulsifying agents to form spray compositions. Such compositions are readily employed for the control of plant-pathogens or can be dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the tetrazoloquinoline compounds can be compounded with a suitable water-immiscible organic liquid and a surface active dispersing agent to produce emulsifiable concentrates which can be further diluted with water and oil to form spray mixtures in the form of oil-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers such as condensation products of alkylene oxides with the inorganic acids, polyoxyethylene derivatives of sorbitan esters, complex ether alcohols and the like. Suitable organic liquids which can be employed in the compositions include petroleum oils and distillates, toluene, and synthetic organic oils. The surface active dispersing agents are usually employed in liquid compositions in the amount of from 0.1 to 20.0 percent by weight of the combined weight of the dispersing agent and active compound.

When operating in accordance with the present invention, the tetrazoloquinoline compounds or a composition containing the compounds can be applied to the fungal organisms to be controlled, or to their habitats in any convenient fashion, e.g., by means of hand dusters or sprayers. Applications to the above-ground portions of plants conveniently can be carried out with power dusters, boom sprayers, high-pressure sprayers, and spray dusters. In large-scale operatons, dusts or low-volume sprays can be applied from airplanes. In the use of the tetrazoloquinoline compounds for the control of rice blast, specialized modes of application may be preferred, owing to the peculiar cultural conditions under which rice is grown. Such specialized methods include surface water application, soak treatment of plants to be transplanted, seed treatment, and the like; other methods will be obvious to those skilled in the art.

The following examples illustrate the utility of the tetrazoloquinoline compounds for the control of plant pathogens and will enable those skilled in the art to practice the same.

Examples 94–136;

Various of the tetrazoloquinoline compounds to be employed in accordance with the present invention were evaluated for the control of Colletotrichum lagenarium (anthracnose) on cucumber. These evaluations were conducted in accordance with the following procedure.

In each individual evaluation, a 4-inch pot containing sterilized soil, with a layer of vermiculite on the surface, was seeded with four cucumber seeds and held under normal greenhouse conditions. The seedlings were thinned to two plants; about fifteen days after the seeding, the foliage was sprayed with a solution of the respective tetrazoloquinoline compound, permitted to dry, and then inoculated by spraying it with a water suspension of conidia of Colletotrichum lagenarium.

Each tetrazoloquinoline was formulated by dispersing it in a specified amount of cyclohexanone containing a small amount of a blend of two sulfonate-nonionic surfactants, and then diluting with water to obtain an ultimate treating composition containing a specified amount of the given compound, in addition to the cyclohexanone in a concentration of 0.67 percent and the surfactant blend in a concentration of 0.0353 percent.

The suspension of conidia was prepared by culturing the fungus in petri plates on orange juice agar at 22°C. for 14 days. The plates were then flooded with distilled water and the surface scraped. The resulting aqueous suspension from four plates were filtered through cheesecloth, brought up to a volume of 50 milliliters, and used for spraying plants in about 35 pots.

After the plants had been inoculated, they were placed in a moist chamber at 24°C. for 40 hours, then removed and held for about nine days under normal greenhouse conditions, and then evaluated for control of anthracnose.

In each evaluation, there was a control, based on treatment by an aqueous control solution containing cyclohexanone and the surfactant blend in the same respective concentrations.

The results of the evaluations were as set forth in the following table, using the following disease rating system:

1 severe
2 moderately severe
3 moderate
4 slight
5 no disease

In the control pots, there was uniformly a heavy infestation of anthracnose on the cucumber plants. Phytotoxicity was uniformly non-existent or only slight in degree.

TABLE 1: CONTROL OF ANTHRACNOSE

| Compound | Concentration of Compound in Treating Solution in ppm. | Disease Rating |
|---|---|---|
| 9-Chlorotetrazolo(1,5-a)quinoline | 400 | 5 |
| 5-(Methoxymethyl)tetrazolo(1,5-a)-quinoline | 400 | 5 |
| 9-(Methoxymethyl)tetrazolo(1,5-a)-quinoline | 400 | 3 |
| 9-(Ethoxymethyl)tetrazolo(1,5-a)-quinoline | 400 | 3 |
| 9-Fluoro-5-methyltetrazolo(1,5-a)-quinoline | 400 | 4+ |
| 9-Chloro-4,5-dihydrotetrazolo(1,5-a)-quinoline | 400 | 4+ |
| 9-Bromo-5-methyltetrazolo(1,5-a)-quinoline | 400 | 3 |
| 5-Chlorotetrazolo(1,5-a)quinoline | 400 | 4 |
| 5-Azidotetrazolo(1,5-a)quinoline | 400 | 4+ |
| 8-Methyltetrazolo(1,5-a)quinoline | 400 | 4 |
| 5-Methyltetrazolo(1,5-a)quinoline | 400 | 4+ |
| 9-Aminotetrazolo(1,5-a)quinoline | 400 | 4 |
| 9-(Hydroxymethyl)tetrazolo(1,5-a)-quinoline | 400 | 4 |
| 9-(Cyanomethyl)tetrazolo(1,5-a)quinoline | 400 | 4+ |
| 5-Chloro-4-methyltetrazolo(1,5-a)-quinoline | 400 | 4 |
| 5-(Hydroxymethyl)tetrazolo(1,5-a)-quinoline | 400 | 4+ |
| 5-Chloro-4-ethyltetrazolo(1,5-a)-quinoline | 400 | 4 |
| 5-Morpholinotetrazolo(1,5-a)quinoline | 400 | 4+ |
| 5-Chloro-7-methyltetrazolo(1,5-a)-quinoline | 400 | 4+ |
| 5-Chloro-9-methyltetrazolo(1,5-a)-quinoline | 400 | 5 |
| 5,9-Dichlorotetrazolo(1,5-a)quinoline | 400 | 4 |
| 5-Azido-9-chlorotetrazolo(1,5-a)-quinoline | 400 | 3 |
| 5-Chloro-4,9-dimethyltetrazolo-(1,5-a)quinoline | 400 | 5 |
| 5-Chloro-9-fluoro-4-methyltetrazolo(1,5-a)quinoline | 400 | 4+ |
| 7-Chloro-9-methyltetrazolo(1,5-a)-quinoline | 400 | 5 |
| 9-Ethyl-5-methyltetrazolo(1,5-a)-quinoline | 400 | 5 |
| 7-Ethyl-5-methyltetrazolo(1,5-a)-quinoline | 400 | 5 |
| 9-Chloro-5-methyltetrazolo(1,5-a)-quinoline | 400 | 4 |
| 7-Methyltetrazolo(1,5-a)quinoline | 400 | 4 |
| 7-Chloro-4,5-dihydrotetrazolo-(1,5-a)quinoline | 400 | 3– |
| 5-Bromotetrazolo(1,5-a)quinoline | 400 | 4 |
| 5,9-Dimethyltetrazolo(1,5-a)-quinoline | 400 | 5 |
| 4,5-Dihydrotetrazolo(1,5-a)-quinoline | 400 | 4+ |
| | 400 | 4+ |

| Compound | ppm | Rating |
|---|---|---|
| 5,7-Dimethyltetrazolo(1,5-a)quinoline | 400 | 4+ |
| 9-Methyltetrazolo(1,5-a)quinoline | 400 | 5 |
| 5-((Ethylamino)methyl)tetrazolo-(1,5-a)quinoline | 400 | 3 |
| 4,5-Dihydro-5-methyltetrazolo-(1,5-a)quinoline | 400 | 3 |
| 4,5-Dichloro-4,5-dihydrotetrazolo-(1,5-a)quinoline | 400 | 4+ |
| 5-Chlorotetrazolo(1,5-a)quinoline | 400 | 4 |
| 4-Methyltetrazolo(1,5-a)quinoline | 400 | 3+ |
| 9-Acetamidotetrazolo(1,5-a)quinoline | 400 | 4 |
| 5-Chloro-9-fluorotetrazolo(1,5-a)quinoline | 400 | 5 |
| 4,5-Dihydro-7-methoxytetrazolo-(1,5-a)quinoline | 400 | 3— |

Examples 137–163:

Representative tetrazoloquinoline compounds were also evaluated for the control of the causative pathogen of crown gall disease (*Agrobacterium tumefaciens*) on tomato plants. Each such evaluation was conducted in accordance with the following procedure.

Three tomato seeds were planted in sand in 4-inch plastic pots, and later thinned to two plants. Meanwhile, an inoculum of *Agrobacterium tumefaciens* was grown in test tubes on homemade potato dextrose agar. The cultures were then flooded with sterile water to make the required amount of bacterial suspensions, which was used to inoculate the tomato seedlings at about four weeks following seeding. The inoculation was carried out by dipping a small insect mounting needle into the bacterial suspension and then passing the needle through the stem of each tomato plant. The plants were then removed from the sand and the roots of each placed in an aqueous solution in a large test tube, the solution containing the test chemical in a concentration of 40 ppm., 0.067 percent cyclohexanone, and 0.00353 percent surfactant, and sodium chloride in a concentration of 0.85 percent. The plants were held under normal greenhouse conditions, with daily aeration, for about 10 days. At this time, each plant was observed to determine the presence of crown gall disease.

A control was conducted by placing two inoculated plants in a solution in a separate test tube, which solution contained all ingredients except test chemical. This test tube was held and treated in all other respects exactly like the tubes containing the treated plants.

The results of the evaluations are presented in the following table, employing the same rating scales as in previous examples. All control plants showed extensive symptoms of crown gall disease. Phytotoxicity was in all instances either non-existent or of only slight degree.

TABLE 2: CONTROL OF CROWN GALL

| Compound | Concentration of Compound in Treating Solution in ppm. | Disease Rating |
|---|---|---|
| 9-Chloro-4,5-dihydrotetrazolo-(1,5-a)quinoline | 40 | 5 |
| 4,5-Dihydro-7-methyltetrazolo-(1,5-a)quinoline | 40 | 5 |
| 5-Ethyltetrazolo(1,5-a)quinoline | 40 | 5 |
| 5-Chlorotetrazolo(1,5-a)quinoline | 40 | 5 |
| Tetrazolo(1,5-a)quinoline | 40 | 4 |
| 7-Chlorotetrazolo(1,5-a)quinoline | 40 | 4+ |
| 5-Azidotetrazolo(1,5-a)quinoline | 40 | 3 |
| 8-Methyltetrazolo(1,5-a)quinoline | 40 | 5 |
| 5-Chloro-4-methyltetrazolo(1,5-a)quinoline | 40 | 3 |
| 5-Chloro-4-ethyltetrazolo(1,5-a)quinoline | 40 | 4 |
| 5-Morpholinotetrazolo(1,5-a)quinoline | 40 | 5 |
| 5-Chloro-7-methyltetrazolo(1,5-a)quinoline | 40 | 5 |
| 5-Chloro-9-methyltetrazolo(1,5-a)quinoline | 40 | 5 |
| 5-Azido-7-methyltetrazolo(1,5-a)quinoline | 40 | 4 |
| 5-Chloro-9-fluoro-4-methyltetrazolo-(1,5-a)quinoline | 40 | 3— |
| 9-Ethyl-5-methyltetrazolo(1,5-a)quinoline | 40 | 5 |
| 7-Ethyl-5-methyltetrazolo(1,5-a)quinoline | 40 | 5 |
| 7-Methyltetrazolo(1,5-a)quinoline | 40 | 5 |
| 7-Chloro-4,5-dihydrotetrazolo-(1,5-a)quinoline | 40 | 5 |
| 5-Bromotetrazolo(1,5-a)quinoline | 40 | 5 |
| 5,9-Dimethyltetrazolo(1,5-a)quinoline | 40 | 5 |
| 9-Methyltetrazolo(1,5-a)quinoline | 40 | 5 |
| 5-Chlorotetrazolo(1,5-a)quinoline | 40 | 5 |
| 4-Methyltetrazolo(1,5-a)quinoline | 40 | 4 |
| 4,5-Dihydro-7-methoxytetrazolo-(1,5-a)quinoline | 40 | 5 |
| 7-Chloro-5-methyltetrazolo(1,5-a)quinoline | 40 | 5 |

Examples 164–169:

Various of the present tetrazoloquinoline compounds were evaluated for the contol of powdery mildew (*Erysiphe polygoni*) on beans. The evaluations were conducted as follows.

In 4-inch pots of soil, four bean seeds were planted, and later thinned to two seedlings. On the tenth day following seeding, a test chemical was applied to the young plants in the form of a composition formulated as described hereinabove in Examples 94–136. The treated plants were then placed near to and beneath other plants heavily infested with powdery mildew, to assure infestation of the treated plants by natural air currents. In this relationship, the plants were held under normal greenhouse conditions for about 7 to 10 days, at which time the plants were observed to determine the presence of symptoms of powdery mildew disease. A control was run with each evaluation; the control consisted of a group of four plants treated with a solvent-emulsifier solution containing no test chemical, also as described in Examples 94–136. The results are as set forth in the following table, employing the same rating scales as in previous examples. In the controls, the bean plants uniformly showed heavy infestation by powdery mildew. No phytotoxicity was observed on any of the groups of plants.

TABLE 3: CONTROL OF POWDERY MILDEW

| Compound | Concentration of Compound in Treating Solution in ppm. | Disease Rating |
|---|---|---|
| 9-Chlorotetrazolo(1,5-a)quinoline | 400 | 3 |
| 9(Ethoxymethyl)tetrazolo(1,5-a)-quinoline | 400 -a)- | 3— |
| 5-Chloro-4-methyltetrazolo(1,5-a)-quinoline | 400 | 5 |
| 5,9-Dichloro-4-methyltetrazolo-(1,5-a)quinoline | 400 | 5 |
| 9-Ethyl-5-methyltetrazolo(1,5-a)-quinoline | 400 | 3— |
| 5-((Ethylamino)methyl)tetrazolo-(1,5-a)quinoline | 400 | 3 |

Examples 170–214:

Various tetrazoloquinolines were evaluated for the control of rice blast (*Piricularia oryzae*). The evaluation was carried out in accordance with the following procedure: a soil was prepared by blending together equal parts of masonry sand and shredded topsoil. The soil was placed in 4-inch pots and thickly seeded with rice seed. The seeded pots were then held under typical greenhouse conditions for about 2 weeks, by which time there were thick stands of rice seedlings in each pot.

Also, an aqueous suspension of conidia of rice blast was prepared. The fungus was cultured in petri dishes on rice polish agar at 28°C. After eight days, each plate was flooded with 20 milliliters of distilled water and the culture surface was scraped with a rubber policeman to separate conidia.

In each instance, a treating solution prepared as described in Examples 94–136 was sprayed onto the leaf surfaces of the rice stand in one pot, allowed to dry, and the foliage then inoculated with the aqueous suspension of conidia of the rice blast organism. The pot was placed in a moist chamber at 18°C. and held there for 40 hours, then returned to the greenhouse and held under typical greenhouse conditions for 6 days. At this time, readings were made in accordance with the same disease rating scale reported in preceding examples. The control was conducted as follows: Pots of rice seedlings were sprayed with an aqueous solution of cyclohexanone and the same blend of two sulfonate-nonionic surfactants but containing no compound. Otherwise, the pots were treated identically.

The results of the evaluations are as reported in the following table. Not all of these evaluations were conducted simultaneously. In all tests, however, the untreated control pots showed extensive symptoms of rice blast. Generally, no phytotoxicity was observed; however, on a few of the treated pots, there was slight phytotoxicity.

TABLE 4: CONTROL OF RICE BLAST

| Compound | Concentration of Compound in Treating Solution in ppm. | Disease Rating |
|---|---|---|
| 5,9-Dichlorotetrazolo(1,5-a)quinoline | 400 | 4 |
| Tetrazolo(1,5-a)quinoline | 400 | 5 |
| 5,9-Dichloro-4-methyltetrazolo(1,5-a)quinoline | 400 | 3 |
| 5-Chloro-9-fluoro-4-methyltetrazolo(1,5-a)quinoline | 400 | 5 |
| 5-Azido-9-chlorotetrazolo(1,5-a)quinoline | 400 | 4 |
| 9-Chlorotetrazolo(1,5-a)quinoline | 400 | 5 |
| 5-(Methoxymethyl)tetrazolo(1,5-a)quinoline | 400 | 3 |
| 9-(Ethoxymethyl)tetrazolo(1,5-a)quinoline | 400 | 5 |
| 9-Chloro-4,5-dihydrotetrazolo(1,5-a)quinoline | 400 | 5 |
| 9-Fluoro-5-methyltetrazolo(1,5-a)quinoline | 400 | 4 |
| 4,5-Dihydro-7-methyltetrazolo(1,5-a)quinoline | 400 | 4+ |
| 9-Bromo-5-methyltetrazolo(1,5-a)quinoline | 400 | 5 |
| 7-Chlorotetrazolo(1,5-a)quinoline | 400 | 4 |
| 5-Chlorotetrazolo(1,5-a)quinoline | 400 | 5 |
| 5-Azidotetrazolo(1,5-a)quinoline | 400 | 5 |
| 8-Methyltetrazolo(1,5-a)quinoline | 400 | 4+ |
| 5-Methyltetrazolo(1,5-a)quinoline | 400 | 5 |
| 9-Aminotetrazolo(1,5-a)quinoline | 400 | 4+ |
| 5-(Bromomethyl)tetrazolo(1,5-a)quinoline | 400 | 4 |
| 5-Cyanotetrazolo(1,5-a)quinoline | 400 | 4 |
| 9-(Bromomethyl)tetrazolo(1,5-a)quinoline | 400 | 3 |
| 9-(Hydroxymethyl)tetrazolo(1,5-a)quinoline | 400 | 5 |
| 9-(Cyanomethyl)tetrazolo(1,5-a)quinoline | 400 | 4+ |
| 5-Chloro-4-methyltetrazolo(1,5-a)quinoline | 400 | 5 |
| 5-(Hydroxymethyl)tetrazolo(1,5-a)quinoline | 400 | 4 |
| 5-Chloro-4-ethyltetrazolo(1,5-a)quinoline | 400 | 4+ |
| 5-Morpholinotetrazolo(1,5-a)quinoline | 400 | 5 |
| 5-Chloro-7-methyltetrazolo(1,5-a)quinoline | 400 | 5 |
| 5-Chloro-9-methyltetrazolo(1,5-a)quinoline | 400 | 5 |
| 5-Chloro-4,9-dimethyltetrazolo(1,5-a)quinoline | 400 | 3 |
| 7-Chloro-9-methyltetrazolo(1,5-a)quinoline | 400 | 4+ |
| 9-Ethyl-5-methyltetrazolo(1,5-a)quinoline | 400 | 5 |
| 7-Ethyl-5-methyltetrazolo(1,5-a)quinoline | 400 | 4 |
| 9-Chloro-5-methyltetrazolo(1,5-a)quinoline | 400 | 5 |
| 7-Methyltetrazolo(1,5-a)quinoline | 400 | 4 |
| 7-Chloro-4,5-dihydrotetrazolo(1,5-a)quinoline | 400 | 5 |
| 5-Bromotetrazolo(1,5-a)quinoline | 400 | 4 |
| 5,9-Dimethyltetrazolo(1,5-a)quinoline | 400 | 5 |
| 4,5-Dihydrotetrazolo(1,5-a)quinoline | 400 | 5 |
| 4,5-Dichloro-4,5-dihydrotetrazolo(1,5-a)quinoline | 400 | 4+ |
| 4-Methyltetrazolo(1,5-a)quinoline | 400 | 4 |
| 9-Acetamidotetrazolo(1,5-a)quinoline | 400 | 5 |
| 5-Chloro-5-fluorotetrazolo(1,5-a)quinoline | 400 | 4 |
| 4,5-Dihydro-7-methoxytetrazolo(1,5-a)quinoline | 400 | 5 |
| 5,7-Dimethyltetrazolo(1,5-a)quinoline | 400 | 4+ |

Examples 215–221:

Certain of the tetrazoloquinoline compounds to be employed in accordance with the present invention were also evaluated for control of rice blast when applied to the soil prior to planting. In these evaluations, a quantity of the respective compound was dissolved in ethanol, the solution sprayed with a DeVilbiss atomizer onto soil rotating in a drum, and the soil thus treated placed in 4-inch round pots having no drainage holes. The procedures were such as to constitute a specified number of pounds of the tetrazoloquinoline compound per acre–25 and 12.5 pounds per acre. The pots were then seeded to rice (variety, Nato) and held under typical greenhouse conditions for 2 weeks, at which time the rice seedlings were inoculated with conidia of *Piricularia oryzae* the preparation and inoculation as described in the preceding examples, and held in a moist chamber at 18°C. for 48 hours. The pots were then removed and again held under greenhouse conditions for another 5 days. At this time, observations for disease severity were made; results are as reported below using the rating scale of preceding examples.

There were three replications per test and additionally a control utilizing soil treated only with an aqueous solution of the same concentration of ethanol. In the control plots, there were extensive symptoms of rice blast disease.

TABLE 5: CONTROL OF RICE BLAST, PRE-PLANT SOIL INCORPORATED APPLICATION

| Compound | Rate of Application of Compound in Pounds per Acre | Disease Rating |
|---|---|---|
| 9-Methyltetrazolo(1,5-a)quinoline | 25.0 | 4+ |
|  | 12.5 | 4+ |
| 5-Chlorotetrazolo(1,5-a)quinoline | 25.0 | 4+ |
|  | 12.5 | 4+ |
| 5-Methyltetrazolo(1,5-a)quinoline | 25.0 | 4+ |
|  | 12.5 | 4− |
| 5-Chloro-9-methyltetrazolo(1,5-a)quinoline | 25.0 | 5 |
|  | 12.5 | 4+ |
| 5-Chloro-9-fluorotetrazolo(1,5-a)quinoline | 25.0 | 4+ |
|  | 12.5 | 4− |
| 9-Methyl-4,5-dihydrotetrazolo(1,5-a)quinoline | 25.0 | N.T* |
|  | 12.5 | 5 |
| 4,5-Dihydrotetrazolo(1,5-a)quinoline | 25.0 | 4+ |
|  | 12.5 | 4+ |

*N.T. = not tested

Examples 222–228:

Various of the tetrazoloquinoline compounds to be employed in accordance with the present invention were evaluated for control of rice blast (*Piricularia oryzae*) when applied to the surface of water-saturated soil in which rice was growing.

Rice (variety, Nato) was seeded in 4-inch round pots having no drainage holes. The soil was maintained in water-saturated condition throughout the test which was conducted under greenhouse conditions.

About fourteen days after seeding, the seedlings were treated. Treatment was made by pouring onto the surface of soil in each pot a treating solution prepared as described in Examples 215–221. On the third day following treatment, the plants were inoculated with a pathogen suspension prepared as described in Examples 170–214 and placed in a moist chamber at 18°C. for 48 hours. The plants were then returned to normal greenhouse conditions and held for 5 days, at which time they were examined for the presence, and if present, degree of severity, of symptoms of rice blast.

Three replicates were run for each test. A control was also conducted for each test; the control consisted of usage of an aqueous solution containing 0.5 percent of ethanol, only. The results of the evaluations are reported in the following table. Control pots uniformly showed extensive rice blast disease symptoms.

TABLE 6: CONTROL OF RICE BLAST, SOIL SURFACE APPLICATION

| Compound | Rate of Application of Compound in Pounds per Acre | Disease Rating |
|---|---|---|
| 9-Methyltetrazolo(1,5-a)quinoline | 12.5 | 4+ |
| | 5.0 | 4+ |
| 4,5-Dihydro-5-methyltetrazolo(1,5-a)-quinoline | 25.0 | 4+ |
| | 12.5 | 4 |
| 9-Chloro-4,5-dihydrotetrazolo(1,5-a)-quinoline | 5.0 | 5 |
| Tetrazolo(1,5-a)quinoline | 25.0 | 5 |
| | 12.5 | 4+ |
| | 6.25 | 5 |
| | 5.0 | 4 |
| 5-Chlorotetrazolo(1,5-a)quinoline | 12.5 | 4 |
| | 5.0 | 4+ |
| 4,5-Dihydro-9-methyltetrazolo(1,5-a)-quinoline | 12.5 | 5 |
| | 5.0 | 4+ |
| 4,5-Dihydrotetrazolo(1,5-a)quinoline | 12.5 | 5 |
| | 5.0 | 4+ |

Examples 229–236:

Various of the present tetrazoloquinoline compounds were evaluated for their efficacy in controlling rice blast when applied to the rice seed. The evaluations were conducted in two different methods with respect to the manner of application, one method being a seed soak, the other method being a seed coat.

In the seed soak, the respective tetrazoloquinoline compound to be evaluated was dissolved in ethanol and diluted with water containing 0.1 percent of polyoxyethylene sorbitan monolaurate to obtain a treating solution containing the subject compound in a concentration of 250 parts of compound per million parts of total composition. All solutions uniformly contained 0.5 percent of ethanol and approximately 0.1 percent of the polyoxyethylene sorbitan monolaurate.

Twenty milliliters of each solution were placed in a separate 125-milliliter Erlenmeyer flask and 20 cc. (about 12.5 grams) of rice seed added (variety, Nato). Each flask was stoppered and shaken for 48 hours, at which time the rice was drained and rinsed with tap water.

In the seed coat, the respective tetrazoloquinoline compound to be evaluated was mixed with an inert clay plus one or more emulsifiers, chosen with regard to the particular tetrazolo-quinoline compound. Uniformly, the formulations contained 25 percent of the respective tetrazoloquinoline compound; typically the formulations contained 50 percent of the clay and 25 percent emulsifier. Each formulation was serially diluted with water to obtain a plurality of treating compositions containing varying concentrations of tetrazoloquinoline compound. The treatment of the seed was made by spraying the suspension with a DeVilbiss atomizer onto seed while rotating in a small drum. The rate of application as 1.5 percent water volume based on the weight of seed being treated. Treatment uniformly deposited about 85 percent of the formulation onto the seed. After treatment the seed was removed from the drum and permitted to air dry.

Regardless of the method of application, the treated seed was thereafter planted in 4-inch square pots and held under typical greenhouse conditions. When the emerging rice seedlings had reached a height of 3 to 4 inches (about 14 days after seeding), they were inoculated with a fungal suspension of *Piricularia oryzae* (rice blast) prepared as in Examples 170–214. The plants were then incubated in a moist chamber at 18°C. for 48 hours, after which they were returned to the greenhouse and held for about 5 days. They were then evaluated for disease severity, utilizing the rating system reported in preceding examples.

In each test, there were a plurality of replicates (three in the seed soak, four in the seed coat), and one or two controls. In the case of the seed soak, the control soak solutions were (1) water containing 0.5 percent ethanol and 0.1 percent of polyoxy-ethylene sorbitan monolaurate; and (2) plain water. In the instance of the seed soak, the control coating suspension was a suspension identical to the respective treating suspension but lacing the tetrazoloquinoline compound.

The results of these evaluations were as set forth in the following tables,

TABLE 7: SEED-SOAK EVALUATIONS

| Compound | Concentration of Compound in Treating Solution* | Disease Rating |
|---|---|---|
| 9-Methyltetrazolo(1,5-a)quinoline | 250 | 4 |
| 9-Chloro-4,5-dihydrotetrazoloe(1,5-a)-quinoline | 250 | 5 |
| Tetrazolo(1,5-a)quinoline | 250 | 3+ |
| | (average of 4 evaluations) | |
| 4,5-Dihydro-9-methyltetrazolo(1,5-a)-quinoline | 250 | 4+ |
| 4,5-Dihydrotetrazolo(1,5-a)quinoline | 250 | 4+ |
| ---(Control) | 0 | 1 |

* In ppm. (based on solution volume)

TABLE 8: SEED-COAT EVALUATIONS

| Compound | Conc. of Compounds in Treating Solution* | Grams of Compound/ 100 lb. Seed | Disease Rating |
|---|---|---|---|
| 9-Methyltetrazolo(1,5-a)-quinoline | 1000 | 45.4 | 5 |
| | 500 | 22.7 | 5 |
| | 250 | 11.4 | 4+ |
| 4,5-Dihydrotetrazolo(1,5-a)-quinoline | 1000 | 45.4 | 5 |
| | 500 | 22.7 | 4+ |
| | 250 | 11.4 | 4+ |
| —(Control | 0 | 0 | 1 |

*In ppm. (based on seed weight)

Example 237:

5-Morpholinotetrazolo(1,5-a)quinoline was evaluated for the control of damping off caused by two strains of *Rhizoctania solani*.

The two test pathogens were cultured fourteen to twenty-one days in 500-milliliter Erlenmeyer flasks containing 50 milliliters of nutrient broth or Czapek Dox broth at 26°C. Both cultures were used to incoulate one liter of silty sand. The cultures were prepared for incorporation in the sand by grinding each mycelial mat in a motar containing sand. The mycelial sand mixtures were then thoroughly mixed in the silty sand and allowed to incubate for twenty-four hours before use.

In the evaluation, a 125-gram sample of silty sand infested with the test pathogens, prepared as above described, was placed in a No. 60 can-freeze jar. An indentation was made in the silty sand and 3 grams of a diatomaceous silica were placed in it. The silica was then impregnated with four milliliters of a test solution containing the 5-morpholinotetrazolo(1,5-a)quinoline compound in a concentration equivalent to a specified amount of the compound in pounds per acre. The jar was first hand-shaken for a few seconds and then placed on a roller for several minutes to thoroughly incorporate the test compound. A portion of this soil was then transferred to a 2.5-inch plastic pot and planted to twelve cucumber seeds (variety Green Prolific). The seeds were covered with the remaining silty sand to a depth of one-half inch. All the pots were then placed in a temperature-humidity controlled growth cubicle in the greenhouse and watered as needed. Final results were taken 14 days later, using the same rating scale as in preceding examples. Three replicates were conducted at each compound rate, and the results averaged. A control was employed in which the soil was left untreated.

Two evaluations were conducted in accordance with the foregoing procedures, one in which the treatment rate was 20 pounds, a second in whice the treatment rate was 10 pounds. At the 20-pound treatment rate, the disease incidence was numerically rated at 4.6, and at the 10-pound treatment rate, at 4.3. In the control plants, the disease was severe and was numerically rated at 1.0.

Example 238:

4,5-Dihydrotetrazolo(1,5-a)quinoline also gave essentially complete control of *Rhizoctonia solani* damping off when applied to cucumber seed at treatment rates of 24 and 12 ounces per 100 pounds of seed.

As discussed and illustrated hereinabove, the tetrazoloquinoline compounds can be employed in a wide variety of embodiments. In all such embodiments, the tetrazoloquinoline compounds can be formulated and employed in combination with other agricultural substances, especially other fungicides, or herbicides or insecticides. Such combinations are often preferred; in combination with other fungicides, more complete control of fungal organisms often can be obtained at lower rates of each individual component. In the instance of combination with herbicides and/or insecticides, there can be obtained a control over a wider spectrum of the total pests affecting plants.

Representative and suitable other agricultural substances with which the tetrazoloquinoline compounds can be combined include the herbicides described in U.S. Pat. Nos. 3,120,434, 3,257,190, 3,367,949, and 3,403,180; and the compounds described in U.S. Pat. Nos. 3,396,224 and 3,397,273 and in Belgian Pat. No. 714,003. However, numerous other known agricultural substances are also suitably combined with the tetrazoloquinoline compounds.

The following further examples illustrate the embodiment of the present invention in combination treatment.

Examples 239–248:

The combination of 4,5-dihydrotetrazolo(1,5-a)quinoline, 4-sulfamoyl-2,6-dinitro-N,N-di-n-propylaniline, and isopropyl 2,4-dichlorophenoxyacetate was evaluated for the control of both fungi and weeds growing in simulated rice paddies. In the evaluation, granular formulations were prepared which contained 3 percent of the 4-sulfamoyl-2,6-dinitro-N,N-di-n-propylaniline, 3 percent isopropyl 2,4-dichlorophenoxyaecetate, and 4,5-dihydrotetrazolo(1,5-a)quinoline at concentrations of 15, 7.5, and 3.75 percent. In all formulations, the granule serving as the substrate was attapulgite clay treated by high-pressure extrusion and other processes to improve adsorption efficiency.

Rice (variety Nato) was seeded in 1-gallon, 6-inch-diameter metal cans. The cans were held under normal greenhouse conditions until about twenty-one days after seeding, by which time there were heavy stands of rice seedlings in all of the cans. The cans were then overseeded with barnyard grass, and the cans continued to be held under normal greenhouse conditions until the barnyard grass was in the 1–2 leaf state (about ten days). At this time, the cans were flooded with water to a depth of about one inch, and treated with the above-described formulations. The application rate was 62.6 milligrams of formulation per 6-inch can, equalling 33.5 pounds of granular formulation per acre. The application was made by sprinkling the granules uniformly over the water surface of each can. There were four replications per treatment. The cans were held under typical greenhouse conditions for 3 days, at which time they were inoculated with a spore suspension of rice blast (*Piricularia oryzae*) using a De Vilbiss atomizer. The spore suspension was prepared as described in preceding examples. The plants were incubated for forty-eight hours in a moist chamber at 18°C. and then returned to normal greenhouse conditions and held thereunder. The readings for rice blast were made 6 days after inoculation, and the readings for barnyard grass, 12 days after treatment.

The results were as set forth in the following table, employing the same rating scale as in preceding examples for rice blast, and employing a rating scale of 0–10, with 0 = no control and 10 = 100 percent control, for barnyard grss.

TABLE 9: CONTROL OF RICE BLAST AND BARNYARD GRASS

| Formulation Number | Treatment | Dosage (Lb./A) | Rice Blast Rating | Barn yard Grass Control |
|---|---|---|---|---|
| 1 | 4,5-dihydrotetrazolo(1,5-a)-quinoline | 5 | 4+ | 8.75 |
|   | 4-sulfamoyl-2,6-dinitro-N,N-di-n-propylaniline | 1 | | |
|   | isopropyl 2,4-dichlorophenoxyacetate | 1 | | |

| | | Disease Ratings, Average of Two Plants | | |
|---|---|---|---|---|
| Fungicide | Dosage (ppm.) | Rice Blast | Helminthosporium | Rate Blight |
| 2 4,5-dihydrotetrazolo(1,5-a)-quinoline | 2.5 | | | |
| 4-sulfamoyl-2,6-dinitro-N,N-di-n-propylaniline | 1 | 4— | 9 | |
| isopropyl 2,4-dichlorophenoxyacetate | 1 | | | |
| 3 4,5-dihydrotetrazolo(1,5-a)-quinoline | 1.25 | | | |
| 4-sulfamoyl-2,6-dinitro-N,N-di-n-propylaniline | 1 | 3+ | 8.5 | |
| isopropyl 2,4-dichlorophenoxyacetate | 1 | | | |
| 4 4,5-dihydrotetrazolo(1,5-a)-quinoline | 5 | 4+ | 0 | |
| 5 4,5-dihydrotetrazolo(1,5-a)-quinoline | 2.5 | 5 | 0 | |
| 6 4,5-dihydrotetrazolo(1,5-a)-quinoline | 1.25 | 4— | 0 | |
| 7 4-sulfamoyl-2,6-dinitro-N,N-di-n-propylaniline | 1 | 2— | 8.75 | |
| isopropyl 2,4-dichlorophenoxyacetate | 1 | | | |
| 8 4-sulfamoyl-2,6-dinitro-N,N-di-n-propylaniline | 1 | 1 | 7.5 | |
| 9 isopropyl 2,4-dichlorophenoxyacetate | 1 | 1+ | 7.25 | |
| 10 Check[A] | 0 | 1 | 0 | |

[A]Check treatment was the same granules without any active compound.

Examples 249–271:

4,5-Dihydrotetrazolo(1,5-a)quinoline was evaluated in combination with various known fungicides for the control of rice blast (Piricularia oryzae), leaf spot (Helminthosporium sativum), and late blight (Phytophthora infestans) on rice, barley, and tomato, respectively. Pots were seeded, one species per pot; when the rice and barley were about 10 days old and tomatoes thirty days old, they were treated.

The treatment was made with a wettable powder formulation of 4,5-dihydrotetrazolo(1,5-a)quinoline and a commercially available wettable powder formulation of a known fungicide, and diluted with water containing a small amount of polyoxyethylene sorbitan monolaurate. Each such suspension was sprayed onto a pot of each species. As control, there were employed two pots of each species which were left completely untreated, and two pots of each species which were sprayed with an aqueous solution containing the same concentration of polyoxyethylene sorbitan monolaurate.

After the plants has dried following spraying, they were inoculated with the causative organism, prepared as described in preceding examples, and thereafter incubated at 18°C., 48 hours for the rice, 48 hours for the barley, and 24 hours for the tomato.

The results were as reported in the following table, using the same rating scale as in preceding examples.

TABLE 10

| | | Disease Ratings, Average of Two Plants | | |
|---|---|---|---|---|
| Fungicide | Dosage (ppm.) | Rice Blast | Helminthosporium | Rate Blight |
| A* + TriBasic CuSO₄ | 50 + 200 | 3 | 3— | 1 |
| TriBasic CuSO₄ | 200 | 1+ | 3— | 1 |
| A + Sulfur | 50 + 200 | 3 | 1 | 1+ |
| Sulfur | 200 | 1 | 1 | 1 |
| A + a mixture of 5.2 parts by weight (83.9 percent) of ammoniates of ethylenebis-(dithiocarbamate)zinc with 1 part by weight (16.1 percent) ethylenebis(dithiocarbamic acid), bimolecular and trimoleclar cyclic anhydrosulfides and disulfides | 50 + 200 | 5 | 4+ | 1+ |
| The mixture of the preceding evaulation, alone | 200 | 2 | 3 | 2 |
| A + triphenyltin hydrodide | 50 + 200 | —G3** | —G3 | 2 |
| Triphenyltin hydroxide | 200 | —G3 | —G3 | 2+ |
| A + 2,4,5,6-tetrachloroisophthalontrile | 50 + 200 | 5 | 4+ | 4 |
| 2,4,5,6-tetrachloroisophthalonitrile | 200 | 5 | 4+ | 4 |
| A + 2,4-dichloro-6-(o-chloroanilino)-s-triazine | 50 + 200 | 5 | 4 | 2 |
| 2,4-dichloro-6-(o-chloroanilino)-s-triazine | 200 | 5 | 4+ | 3— |
| A + as-N-[(1,1,2,2-tetrachloroethyl)thio]-4-cyclohexene-1,2-dicarboximide | 50 + 200 | 4— | 4+ | 2+ |
| as-N-[(1,1,2,2-tetrachloroethyl)thio]-4-cyclohexene-1,2-dicarboximide | 200 | 2 | 4 | 3— |
| A + manganese ethylenebisdithiocarbamate | 50 + 200 | 5 | 4+ | 4+ |
| manganese ethylenebisdithiocarbamate | 200 | 4 | 4+ | 3+ |
| A + N-trichloromethylthio-4-cyclohexene-1,2-dicarboximide | 50 + 200 | 5 | 2— | 3— |
| N-trichloromethylthio-4-cyclohexene-1,2-dicarboximide | 200 | 2 | 4 | 3+ |
| A + zinc ethylenebisdithiocarbamate | 50 + 200 | 5 | 3— | 1+ |
| zinc ethylenebisdithiocarbamate | 200 | 1+ | 1+ | 1 |
| A | 50 | 3 | 1 | 1 |
| Control with aqueous solution of polyoxyethylene sorbitan monolaurate | 0 | 1 | 1 | 1 |
| Umtreated control | 0 | 1 | 1 | 1 |

*A = 4,5-dihydrotetrazolo(4,5-a)quinoline
**—G3 = no rice blast disease rating made, moderate general necrosis

STARTING MATERIALS

The starting materials to be employed in the preparation of compounds of Formula I:

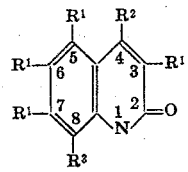

are in some cases known compounds, and are in all cases prepared by known synthetic procedures. Most typically, they are prepared by the reaction sequence described by Mayer et al. in Berichte d. D. Chem. Gesellschaft, volume 60, pages 858–864. In the employment of this reaction sequence in the preparation of the present starting materials, a substituted aniline of the formula

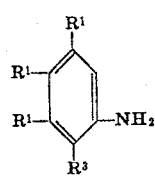

is reacted with a β-chloropropionyl chloride:

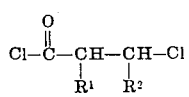

to obtain a first intermediate:

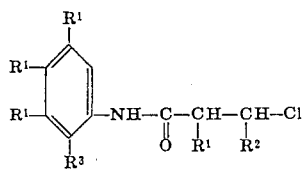

which is cyclized by treatment with aluminum chloride. The compound resulting from cyclization:

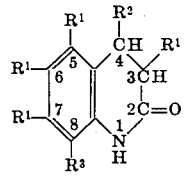

is converted to the desired starting material for the products of Formula I by oxidation; it is also converted to the desired start-ing material for the products of Formula II (Method 2) by reaction with P₂S₅.

I claim:

1. A method for protecting a plant against attack by a plant-pathogenic bacterial or fungal organism which comprises applying to a locus of the said organism an effective amount of an active agent selected from the group consisting of compounds of the formula:

I.

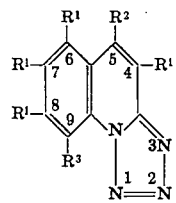

II.

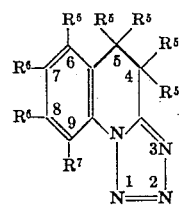

and the phytologically-acceptable mineral acid addition salts of those compounds wherein $R^3$ or $R^7$ represents amino, or $R^1$ or $R^6$ represents —CH₂Y wherein Y is amino or loweralkylamino; wherein, in compounds of Formula I:

each $R^1$ independently represents hydrogen, halo, loweralkyl of $C_1$-$C_3$, formyl, cyano, $R^4$, or substituted methyl of the formula

—CH₂Y wherein Y represents amino, loweralkylamino of $C_1$-$C_3$, cyano, hydroxy, halo, or loweralkoxy of $C_1$-$C_3$;

$R^2$ represens $R^1$ or morpholino;

$R^3$ represents $R^1$, amino, or acetamido, and $R^4$ represents azido, alkenyl of $C_2$-$C_3$, or alkynyl of $C_2$-$C_3$ subject to the limitation that no more than one $R^1$, $R^2$, or $R^3$ substituent represents $R^4$ and that at least three of the $R^1$, $R^2$, and $R^3$ substituents represent hydrogen; and wherein, in compounds of Formula II:

Each $R^5$ independently represents hydrogen, halo, cyano, or loweralkyl of $C_1$-$C_3$;

each $R^6$ independently represents $R^5$, $R^8$, loweralkoxy of $C_1$-$C_3$, or substituted methyl of the formula

—CH₂Y wherein Y, as above, represents amino, loweralkylamino of $C_1$-$C_3$, cyano, hydroxy, halo, or loweralkoxy of $C_1$-$C_3$;

$R^7$ represents $R^6$, amino, or acetamido; and $R^8$ represents alkenyl of $C_2$-$C_3$ or alkynyl of $C_2$-$C_3$, subject to the limitation that no more than one $R^6$ or $R^7$ substituent represents $R^8$, and that at least five of the $R^5$, $R^6$, and $R^7$ substituents represent hydrogen.

2. The method of claim 1 wherein the plant pathogen is a fungus.

3. The method of claim 2 wherein the fungus is the causal agent of rice blast (*Piricularia oryzae*).

4. The method of claim 2 wherein the active agent is 9-methyltetrazolo(1,5-a)quinoline.

5. The method of claim 2 wherein the active agent is 9-chlorotetrazolo(1,5-a)quinoline.

6. The method of claim 2 wherein the active agent is 5-methyltetrazolo(1,5-)quinoline.

7. The method of claim 2 wherein the active agent is 5-chloro-4-methyltetrazolo(1,5-a)quinoline.

8. The method of claim 2 wherein the active agent is 5-chloro-9-methyltetrazolo(1,5-a)quinoline.

9. The method of claim 2 wherein the active agent is 4,5-dihydrotetrazolo(1,5-a)quinoline.

10. The method of claim 2 wherein the active agent is 9-methyl-4,5-dihydrotetrazolo(1,5-a)quinoline.

11. The method of claim 2 wherein the active agent is 5-chlorotetrazolo(1,5-a)quinoline.

12. The method of claim 2 wherein the active agent is tetrazolo(1,5-a)quinoline.

13. The method of claim 2 wherein the active agent is 9-chloro-4,5-dihydrotetrazolo(1,5-a)quinoline.

14. The method of claim 2 wherein the active agent is 4,5-dihydro-5-methyltetrazolo(1,5-a)quinoline.

15. A composition for protecting a plant against attach by a plant-pathogenic bacterial or fungal organism which comrises a non-ionic surface-active dispersing agent, an inert finely divided solid, and an effective amount from about 2 to 98 percent by weight of an active agent selected from the group consisting of compounds of the formulae:

I.

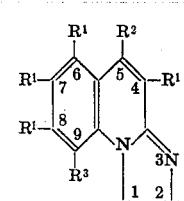

II.

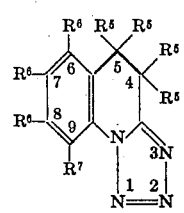

and the phytologically-acceptable mineral acid addition salts of those compounds wherein $R^3$ or $R^7$ represents amino, or $R^1$ or $R^6$ represents —$CH_2Y$ wherein Y is amino or loweralkylamino; wherein, in compounds of Formula I:

each $R^1$ independently represents hydrogen, halo, loweralkyl of $C_1$–$C_3$, formyl, cyano. $R^4$, or substituted methyl of the formula

—$CH_2Y$ wherein Y represents amino, loweralkylamino of $C_1$–$C_3$, cyano. hydroxy, halo, or loweralkoxy of $C_1$–$C_3$;
$R^2$ represents $R^1$ or morpholino;
$R^3$ represents $R^1$amino, or acetamido; and
$R^4$ represents azido, alkenyl of $C_2$–$C_3$, or alkynyl of $C_2$–$C_3$, subject to the limitation that no more than one $R^1$, $R^2$, or $R^3$ substituent represents $R^4$ and that at least three of the $R^1$, $R^2$, and $R^3$ substituents represent hydrogen; and in compounds of Formula II.
each $R^5$ independently represents hydrogen, halo, cyano, or loweralkyl of $C_1$–$C_3$;
each $R^6$ independently represents $R^5$, $R^8$, loweralkoxy of $C_1$–$C_3$, or substituted methyl of the formula

—$CH_2Y$ wherein Y, as above, represents amino, loweralkylamino of $C_1$–$C_3$, cyano, hydroxy, halo, or loweralkoxy of $C_1$–$C_3$;
$R^7$ represents $R^6$ amino, or acetamido; and
$R^8$ represents alkenyl of $C_2$–$C_3$ or alkynyl of $C_2$–$C_3$, subject to the limitation that no more than one $R^6$ or $R^7$ substituent represents $R^8$, and that at least five of the $R^5$, $R^6$, and $R^7$ substituents represent hydrogen.

16. The composition of claim 15 wherein the active agent is 9-methyltetrazolo(1,5-a)quinoline.
17. The composition of claim 15 wherein the active agent is 9-chlorotetrazolo(1,5-a)quinoline.
18. The composition of claim 15 wherein the active agent is 5-methyltetrazolo(1,5-a)quinoline.
19. The composition of claim 15 wherein the active agent is 5-chloro-4-methyltetrazolo(1,5-a)quinoline.
20. The composition of claim 15 wherein the active agent is 5-chloro-9-methyltetrazolo(1,5-a)quinoline.
21. The composition of claim 15 wherein the active agent is 4,5-dihydrotetrazolo(1,5-a)quinoline.
22. The composition of claim 15 wherein the active agent is 4,5-dihydro-9-methyltetrazolo(1,5-a)quinoline.
23. The composition of claim 15 wherein the active agent is 5-chlorotetrazolo(1,5-a)quinoline.
24. The composition of claim 15 wherein the active agent is tetrazolo(1,5-a)quinoline.
25. The composition of claim 15 wherein the active agent is 9-chloro-4,5-dihydrotetrazolo(1,5-a)quinoline.
26. The composition of claim 15 wherein the active agent is 4,5-dihydro-5-methyltetrazolo(1,5-a)quinoline.

* * * * *